US009783398B1

(12) United States Patent
Dartlon

(10) Patent No.: US 9,783,398 B1
(45) Date of Patent: Oct. 10, 2017

(54) HOIST SYSTEM FOR ATVS AND ATV WITH HOIST SYSTEM

(71) Applicant: Donald W. Dartlon, Oak Grove, LA (US)

(72) Inventor: Donald W. Dartlon, Oak Grove, LA (US)

( * ) Notice: Subject to any disclaimer, the term of this patent is extended or adjusted under 35 U.S.C. 154(b) by 0 days.

(21) Appl. No.: 15/206,954

(22) Filed: Jul. 11, 2016

Related U.S. Application Data

(60) Provisional application No. 62/231,566, filed on Jul. 10, 2015.

(51) Int. Cl.
*B66D 1/36* (2006.01)
*B66D 1/60* (2006.01)
*B60D 1/18* (2006.01)
*B60P 1/04* (2006.01)

(52) U.S. Cl.
CPC ............... *B66D 1/36* (2013.01); *B60D 1/185* (2013.01); *B60P 1/04* (2013.01); *B66D 1/60* (2013.01); *B66D 2700/0191* (2013.01); *B66D 2700/026* (2013.01)

(58) Field of Classification Search
CPC .. B66C 23/44; B66D 1/36; B66D 1/38; B66D 2700/0191; B66D 2700/026; B60P 1/04
See application file for complete search history.

(56) References Cited

U.S. PATENT DOCUMENTS

| 2,519,119 | A | | 8/1950 | Dalbeck | |
|---|---|---|---|---|---|
| 3,927,779 | A | | 12/1975 | Johnson | |
| 4,400,132 | A | * | 8/1983 | Deline | A01G 23/006 254/327 |
| 4,880,346 | A | | 11/1989 | Brassette | |
| 5,393,194 | A | | 2/1995 | Smith | |
| 6,530,738 | B2 | | 3/2003 | Maxwell | |
| 6,631,886 | B1 | * | 10/2003 | Caudle | B66D 1/36 254/327 |
| 7,896,604 | B1 | | 3/2011 | Donlin et al. | |
| 7,992,732 | B2 | | 8/2011 | Demiany et al. | |
| 2011/0168961 | A1 | * | 7/2011 | Christiansen | B66D 3/006 254/327 |
| 2016/0311666 | A1 | * | 10/2016 | Anderson | B66D 1/36 |

* cited by examiner

*Primary Examiner* — Daniel J Colilla
(74) *Attorney, Agent, or Firm* — R. Keith Harrison

(57) ABSTRACT

A hoist system for hoisting an object onto an all-terrain vehicle having a first vehicle end and a second vehicle end includes a winch configured for mounting on the vehicle at the first vehicle end. A cable may be engaged by the winch. The cable may have sufficient length to extend from the winch over the vehicle beyond the second vehicle end. At least one overhead cable guide assembly may be configured for mounting in upward-standing relationship on the vehicle between the first vehicle end and the second vehicle end. The at least one overhead cable guide assembly may support the cable. An all-terrain vehicle having a hoist system is also disclosed.

10 Claims, 10 Drawing Sheets

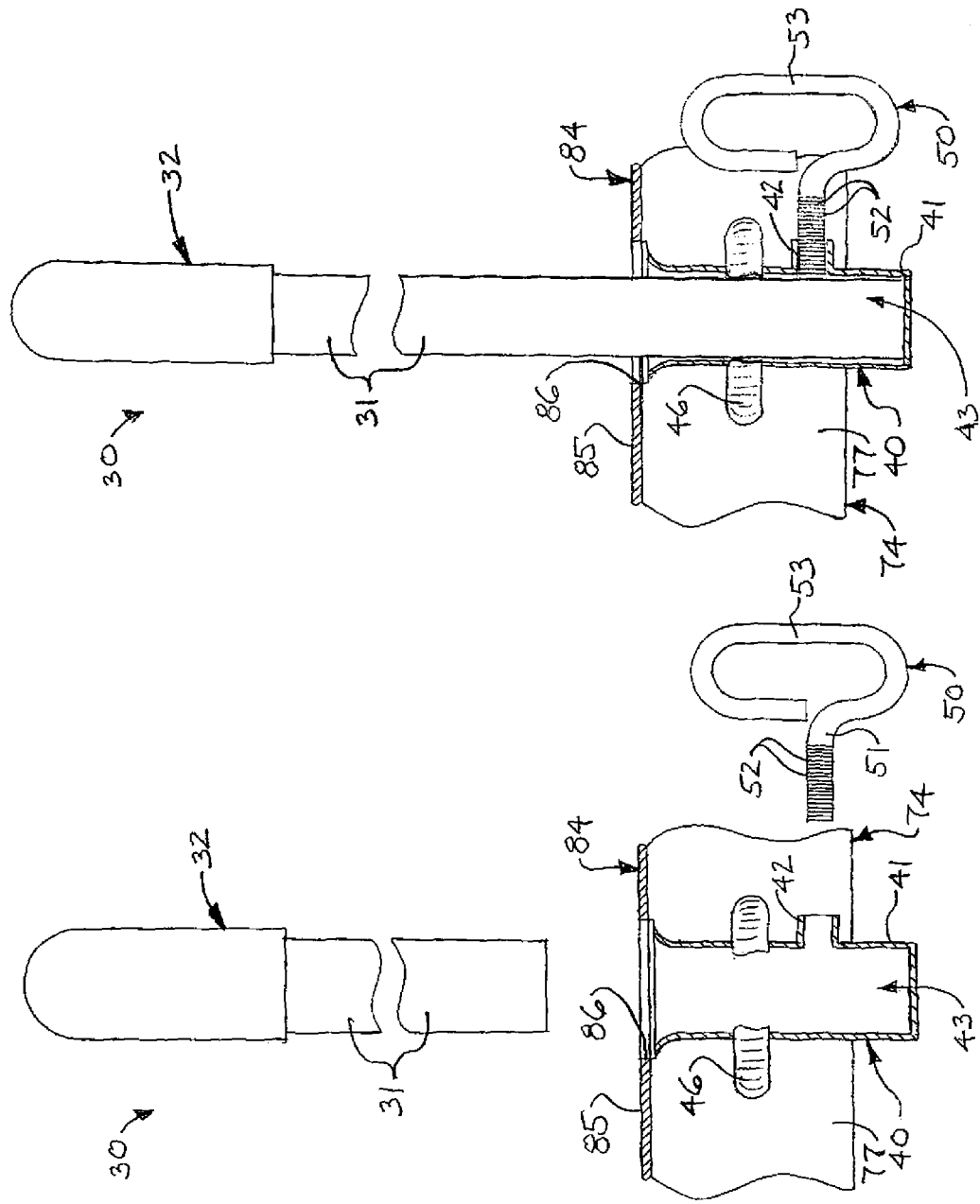

HOIST SYSTEM FOR ATVS AND ATV WITH HOIST SYSTEM

CROSS-REFERENCE TO RELATED APPLICATIONS

This application claims the benefit of U.S. provisional application No. 62/231,566, filed Jul. 10, 2015 and entitled EZ GAME LOADER, which provisional application is incorporated by reference herein in its entirety.

SUMMARY

Illustrative embodiments of the disclosure are generally directed to a hoist system for hoisting an object onto an all-terrain vehicle having a first vehicle end and a second vehicle end. The hoist system may include a winch configured for mounting on the vehicle at the first vehicle end. A cable may be engaged by the winch. The cable may have sufficient length to extend from the winch over the vehicle beyond the second vehicle end. At least one overhead cable guide assembly may be configured for mounting in upward-standing relationship on the vehicle between the first vehicle end and the second vehicle end. The at least one overhead cable guide assembly may support the cable.

Illustrative embodiments of the disclosure are further generally directed to an all-terrain vehicle. The all-terrain vehicle may include a vehicle chassis having a first vehicle end, a second vehicle end, a bumper carried by the vehicle chassis at the first vehicle end, a tilt-able bed carried by the vehicle chassis at the second vehicle end, a vehicle frame carried by the vehicle chassis between the first vehicle end and the second vehicle end and a canopy having a canopy top on the vehicle frame. The canopy top may include a shaft opening. A hoist system may include a winch carried by the bumper at the first vehicle end. A cable may be engaged by the winch. The cable may have sufficient length to extend from the winch over the vehicle beyond the second vehicle end. A cable hook may terminate the cable. A cable roller assembly may be carried by the vehicle at the first vehicle end. The cable roller assembly may include a roller assembly bracket carried by the vehicle chassis, at least one pair of spaced-apart cable rollers carried by the roller assembly bracket and a cable space between the cable rollers. The cable may extend through the cable space. At least one overhead cable guide assembly may be mounted in upward-standing relationship on the vehicle between the first vehicle end and the second vehicle end. The at least one overhead cable guide assembly may include a shaft receptacle carried by the vehicle frame of the vehicle beneath the canopy top of the canopy. The shaft receptacle may have a receptacle interior disposed in alignment with the shaft opening in the canopy top of the canopy. A cable guide shaft may extend through the shaft opening in the canopy top of the canopy and may be seated in the receptacle interior of the shaft receptacle. A cable guide bracket may be carried by the cable guide shaft. The cable guide bracket may support the cable. A cable guide may be carried by the vehicle bumper at the first vehicle end. The cable guide may support the cable between the cable roller assembly and the at least one overhead cable guide assembly.

BRIEF DESCRIPTION OF THE DRAWINGS

Illustrative embodiments of the disclosure will now be described, by way of example, with reference to the accompanying drawings, in which:

FIG. 10 is an exploded sectional side view illustrating typical deployment of the cable guide shaft on each overhead cable guide assembly in the shaft receptacle provided on the ATV frame of the ATV;

FIG. 11 is a sectional side view with the cable guide shaft of the overhead cable guide assembly mounted and secured in the shaft receptacle;

DETAILED DESCRIPTION

Figure 1:
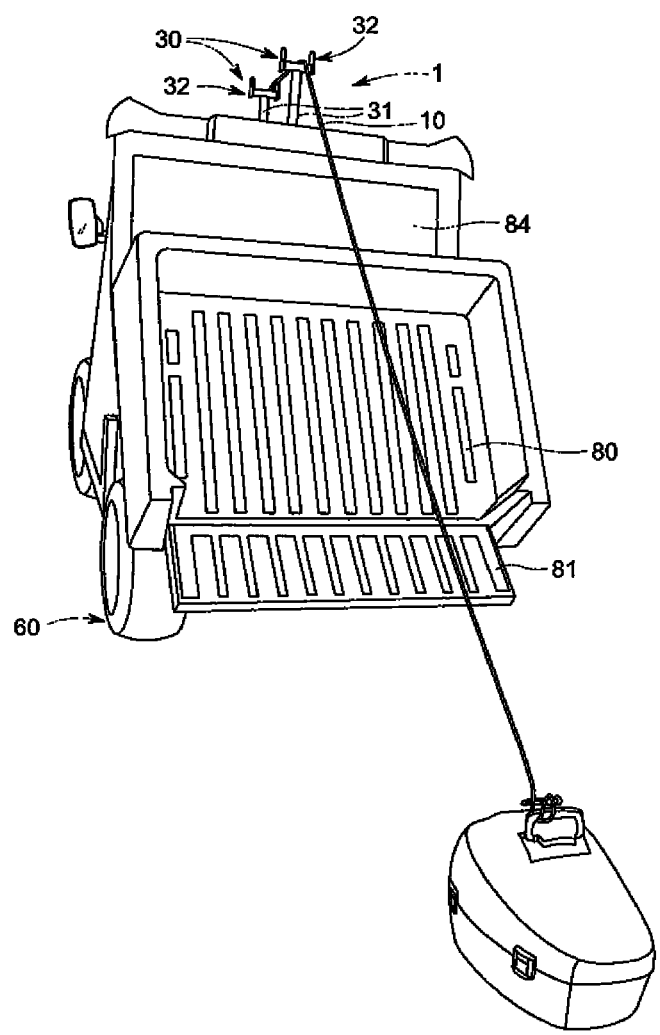
FIG. 1 is a rear perspective view of an ATV, with an illustrative embodiment of the hoist system for ATVs installed on the ATV and secured to an object to hoist the object from the ground into an ATV bed on the ATV.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 13:
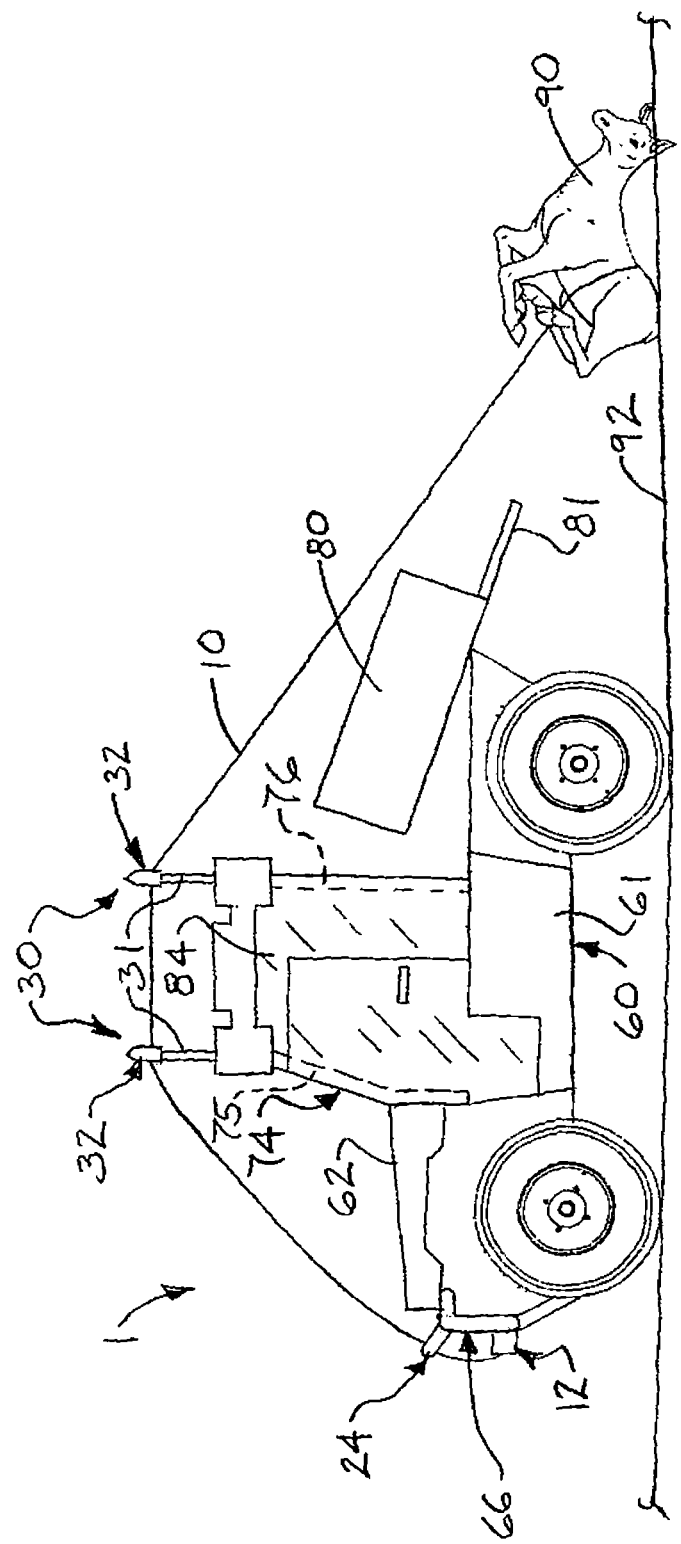
FIG. 13 is a side view of the ATV with the cable in the extended configuration, a game carcass secured to the cable and the ATV bed in the tilted loading/unloading position preparatory to hoisting the game carcass into the ATV bed.
Figure 14:
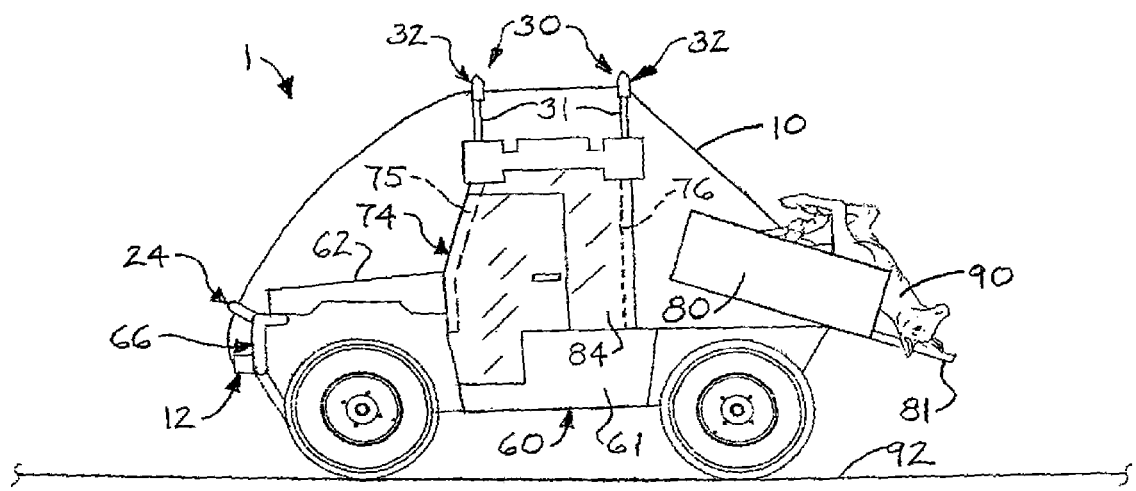
FIG. 14 is a side view of the ATV after winding and shortening of the cable to hoist the game carcass into the tilted ATV bed of the ATV.
Figure 15:
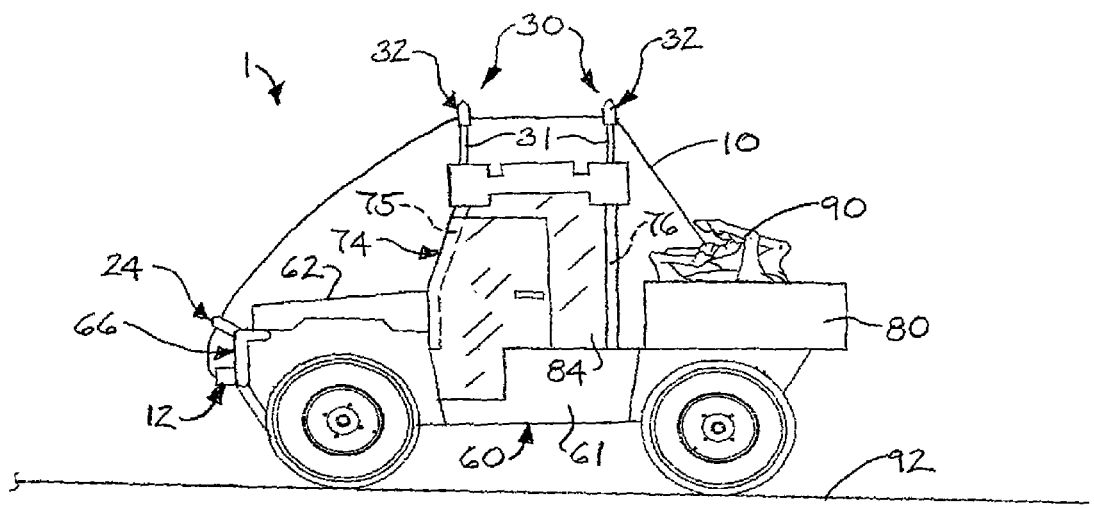
FIG. 15 is a side view of the ATV with the game carcass in the ATV bed and the ATV bed returned to the upright transport position.

Referring to the drawings, an illustrative embodiment of the hoist system for ATVs, hereinafter hoist system, is generally indicated by reference numeral 1. As illustrated in FIGS. 13-15 and will be hereinafter described, the hoist system 1 may be mounted on an ATV (All-Terrain Vehicle) 60 to facilitate loading of an object 90 such as a game carcass, for example and without limitation, into a tilt-able ATV bed 80 on the rear of the ATV 60. The hoist system 1 may include a winch 2 (FIG. 7) which is mounted on the front of the ATV 60, typically in a manner which will be hereinafter described. A cable 10 may be engaged by the winch 2. The cable 10 may extend from the front of the ATV 60, over the top and beyond the rear of the ATV 60 for engagement with the object 90 to facilitate hoisting of the object 90 into the ATV bed 80, as illustrated in FIGS. 13-15 and will be hereinafter described.

Figure 4:
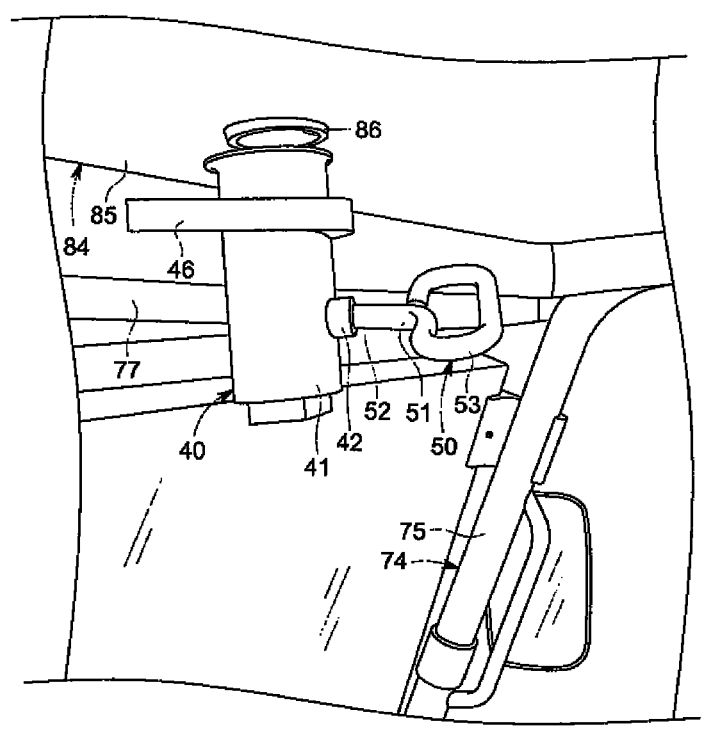
FIG. 4 is a perspective view of a typical shaft receptacle and shaft retention bolt for securing each overhead cable guide assembly on the ATV according to an illustrative embodiment of the hoist system for ATVs.
Figure 5:
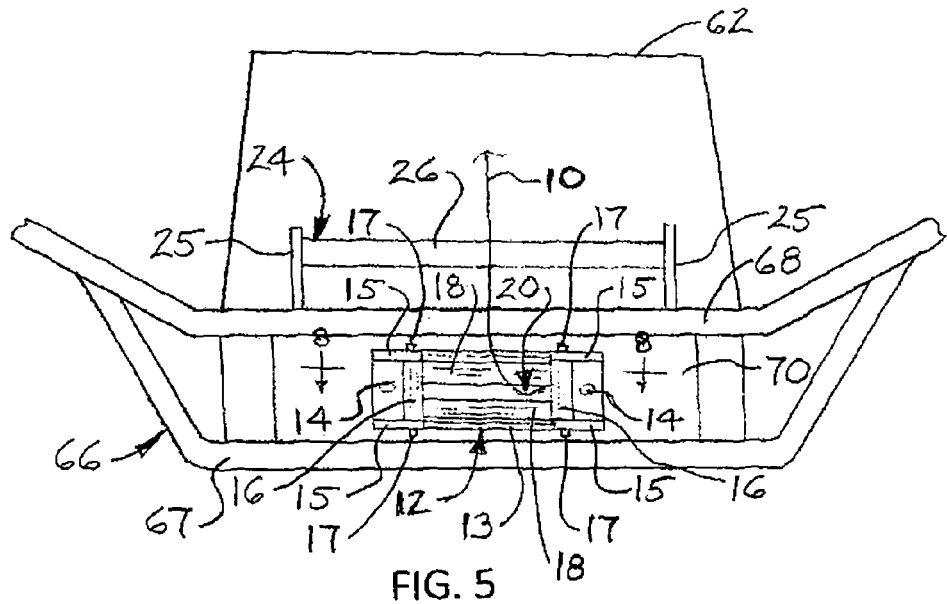
FIG. 5 is a front view of the front bumper on the ATV with the cable roller assembly mounted on the front bumper and a front cable guide mounted on the front bumper above the cable roller assembly.
Figure 6:
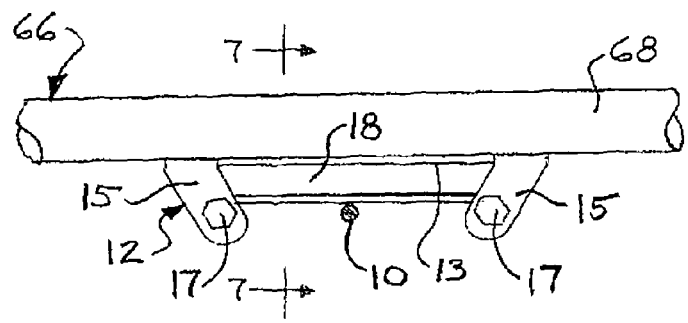
FIG. 6 is a top view of the cable roller assembly mounted on the front bumper (illustrated in section)

As illustrated in FIGS. 13-15, the ATV 60 may have a conventional design with a wheeled ATV chassis 61 and a hood 62. A front bumper 66 may be mounted on the front end of the ATV chassis 61. As illustrated in FIG. 5, the front bumper 66 may include a lower bumper member 67 and an upper bumper member 68. As illustrated in FIGS. 13-15, the ATV 60 may further include an upward-standing ATV frame 74 which extends from the ATV chassis 61. The ATV frame 74 may include a pair of spaced-apart front vertical frame members 75 (one of which is illustrated) and a pair of spaced-apart rear vertical frame members 76. A front horizontal frame member 77 (FIG. 4) may extend between the front vertical frame members 75. A rear horizontal frame member (not illustrated) may in like manner extend between the rear vertical frame members 76. In some applications, a canopy 84 may be deployed on the ATV frame 74 to cover the passenger compartment (not illustrated) in the ATV chassis 61. The ATV bed 80 is typically mounted on the rear end of the ATV chassis 61. As illustrated in FIGS. 13 and 14, the ATV bed 80 may have a hinged tailgate 81 which can be selectively raised and lowered typically in the conventional manner. As illustrated in FIG. 4, the canopy 84 may have a canopy top 85. It will be recognized and understood that the foregoing description of the ATV 60 is non-limiting and exemplary and the hoist system 1 may be suitable for application to ATVs of alternative design known by those skilled in the art.

Figure 7:
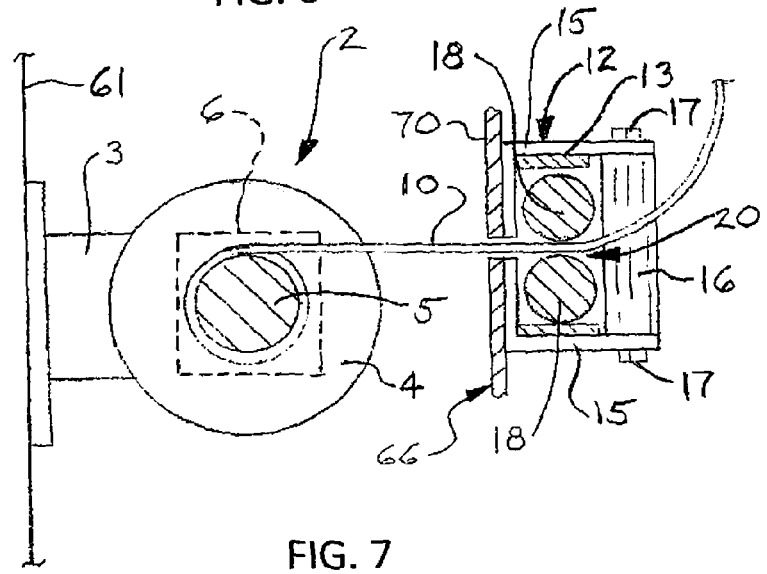
FIG. 7 is a sectional side view, taken along section lines 7-7 in FIG. 6, of the cable roller assembly and cable extending through the cable roller assembly, more particularly illustrating a winch mounted behind the cable roller assembly and the cable wound on the winch.

As illustrated in FIG. 7, in some applications, the winch 2 of the hoist system 1 may be mounted on the ATV chassis 61 behind the front bumper 66 of the ATV 60 according to the knowledge of those skilled in the art. The winch 2 may have a conventional design with a winch mount bracket 3 which may be bolted and/or otherwise attached to the ATV chassis 61. A winch spool 4 may be mounted for rotation on the winch mount bracket 3. The winch spool 4 may have a winch shaft 5 on which the cable 10 may be wound. In some embodiments, a typically electric winch motor 6 (illustrated in phantom) may drivingly engage the winch spool 4 for rotation. In other embodiments, a hand crank (not illustrated) may drivingly engage the winch spool 4 for rotation according to the knowledge of those skilled in the art. In some embodiments, the winch 2 may include a commercially-available, 3500-pound capacity electric winch, for example and without limitation.

Figure 8:
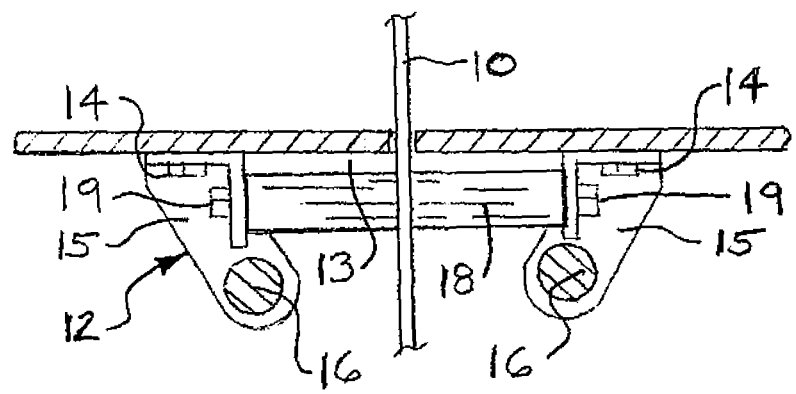
FIG. 8 is a sectional top view, taken along section lines 8-8 in FIG. 5, of the cable roller assembly.

As illustrated in FIGS. 2 and 5-8 of the drawings, in some embodiments, the hoist system 1 may include a cable roller assembly 12. The cable roller assembly 12 may guide the cable 10 as the cable 10 extends forwardly from the winch 2. The cable roller assembly 12 may include a roller assembly bracket 13 which may be mounted on the front bumper 66 of the ATV 60 according to the knowledge of those skilled in the art. Accordingly, in some embodiments, the roller assembly bracket 13 may be bolted to a roller assembly mount plate 70 (FIGS. 5 and 7) which is provided on the front bumper 66, such as by using roller mount fasteners 14. Two pairs of vertically-spaced roller mount arms 15 may extend from the roller assembly bracket 13 in spaced-apart relationship to each other. A pair of generally elongated, parallel, spaced-apart vertical cable rollers 16 may be rotatably mounted between the respective pairs of roller mount arms 15, such as via a pair of cable roller fasteners 17. As illustrated in FIG. 8, a pair of spaced-apart horizontal cable rollers 18 may be rotatably mounted on the roller assembly bracket 13 between and perpendicular to the vertical cable rollers 16, such as via a pair of cable roller fasteners 19. As illustrated in FIGS. 5 and 7, an elongated cable space 20 may be formed by and between the vertical cable rollers 16 and the horizontal cable rollers 18. Accordingly, as illustrated in FIG. 7, the cable 10 may extend forwardly through the cable space 20 of the cable roller assembly 12 as it extends from the winch 2.

Figure 2:
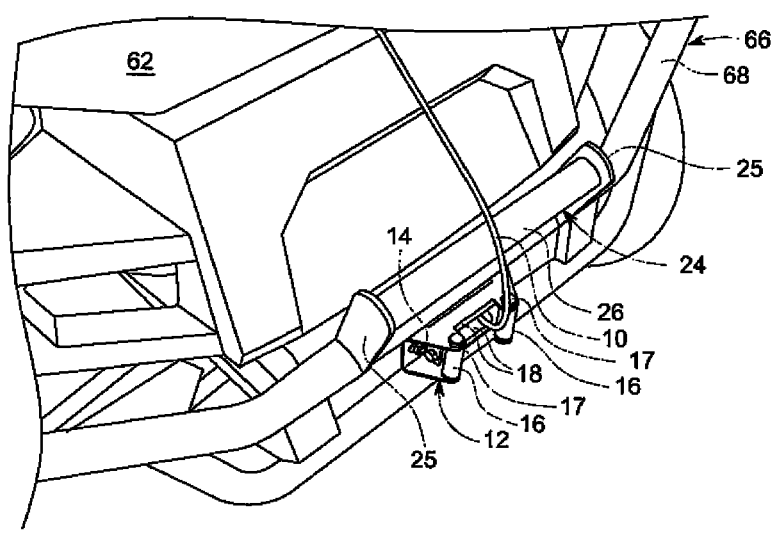
FIG. 2 is a front perspective view of the ATV with a typical cable roller assembly and front cable guide of the hoist system for ATVs mounted on a front bumper of the ATV and a cable extending through the cable roller assembly and engaging the front cable guide.
Figure 3:
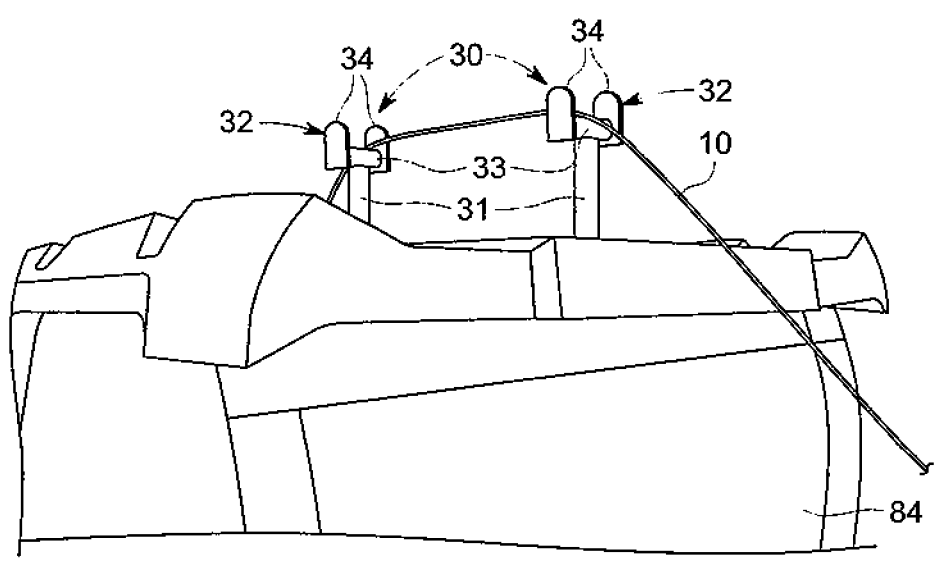
FIG. 3 is a perspective view of a pair of overhead cable guide assemblies of the hoist system for ATVs, deployed on the ATV with the cable extending over the overhead cable guide assemblies.

As further illustrated in FIGS. 2 and 5, in some embodiments, a front cable guide 24 may be provided on the upper bumper member 68 of the front bumper 66. The front cable guide 24 may include a pair of spaced-apart cable guide brackets 25 which extend from the upper bumper member 68 of the front bumper 66. An elongated cable guide member 26 may extend between the cable guide brackets 25. The cable guide brackets 25 may be fixedly attached to the upper bumper member 68 via welding or releasably attached to the upper bumper member 68 via clamps, bolts, brackets, screws and/or other mechanical fastening techniques (not illustrated) known by those skilled in the art. In some embodiments, each cable guide bracket 25 may be oriented at about 30 degrees with respect to a vertical axis. Accordingly, after it exits the cable space 20 of the cable roller assembly 12, the cable 10 may engage the cable guide member 26 of the front cable guide 24, which may prevent the cable 10 from contacting the ATV hood 62 of the ATV 60, as illustrated in FIGS. 13-15.

Figure 9:
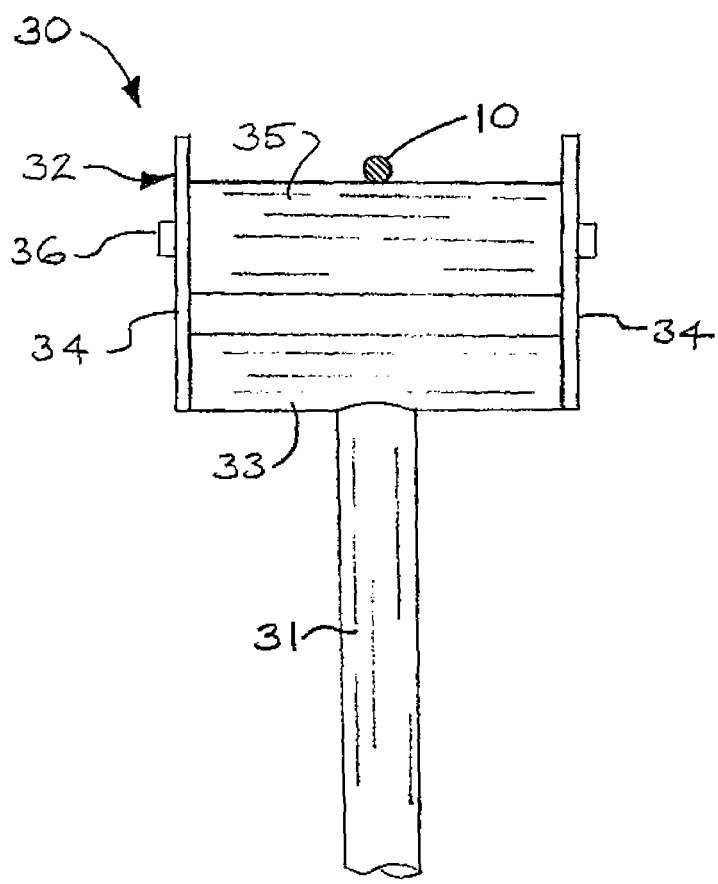
FIG. 9 is a front view, partially in section, of a typical overhead cable guide assembly including a cable guide bracket having a cable guide roller, with the cable engaging the cable guide roller.

As illustrated in FIGS. 10, 11 and 13-15, the hoist system 1 may include at least one overhead cable guide assembly 30 which may extend upwardly from the ATV frame 74 of the ATV 60. In some embodiments, a pair of spaced-apart cable guide assemblies 30 may extend from the ATV frame 74 in front-rear relationship to each other, as illustrated. The cable guide assemblies 30 may guide the cable 10 after it extends from the cable roller assembly 12 at the front of the ATV 60 to the rear of the ATV 60, as will be hereinafter further described. Each overhead cable guide assembly 30 may include a cable guide shaft 31. A cable guide bracket 32 may be provided on an upper end of the cable guide shaft 31. As illustrated in FIG. 9, the cable guide bracket 32 may include a cable guide crosspiece 33 which perpendicularly terminates the upper end of the cable guide shaft 31. A pair of spaced apart cable guide flanges 34 may extend from respective ends of the cable guide crosspiece 33. In some embodiments, the cable 10 may engage the cable guide crosspiece 33 as it traverses from the front to the rear of the ATV 60. As illustrated in FIG. 9, in other embodiments, a cable guide roller 35 may be mounted between the cable guide flanges 34 such as via a roller axle 36. The cable 10 may engage the cable guide roller 35, as illustrated.

The cable guide shaft 31 of each overhead cable guide assembly 30 may be mounted on the ATV frame 74 according to the knowledge of those skilled in the art. As illustrated in FIGS. 4, 10 and 11, in some embodiments, a shaft receptacle 40 may be mounted on the front horizontal frame member 77 of the ATV frame 74. In some embodiments, an additional shaft receptacle 40 may be mounted on the rear horizontal frame member (not illustrated) of the ATV frame 74. Each shaft receptacle 40 may be fixedly or releasably mounted on the corresponding front horizontal frame member 77 or rear horizontal frame member, beneath the canopy top 85 of the canopy 84, such as by using a suitable receptacle mount bracket 46.

As illustrated in FIGS. 10 and 11, each shaft receptacle 40 may have a receptacle wall 41 which defines a receptacle interior 43. The receptacle interior 43 may be suitably sized and configured to accommodate the cable guide shaft 31 of the overhead cable guide assembly 30. A shaft opening 86 may extend through the canopy top 85 in alignment or registration with the receptacle interior 43 of the shaft receptacle 40 to accommodate the cable guide shaft 31 as it inserts into the receptacle interior 43. In some embodiments, a plug (not illustrated) made of rubber, plastic or other suitable material may be sealingly inserted into the shaft opening 86 when the hoist system 1 is not in use.

In some embodiments, an interiorly-threaded bolt nipple 42 may extend from the receptacle wall 41 of the shaft receptacle 40. A shaft retention bolt 50 may include a wing bolt having a bolt shaft 51 with exterior bolt threads 52. A bolt handle 53 may be shaped in the bolt shaft 51. Accordingly, the cable guide shaft 31 of the overhead cable guide assembly 30 may be secured in the receptacle interior 43 of the shaft receptacle 40 by rotating the bolt handle 53 and tightening the bolt shaft 51 in the bolt nipple 42 against the cable guide shaft 31 as the bolt threads 52 engage the interiorly-threaded bolt nipple 42. Additionally, the height of the cable guide bracket 32 on each overhead cable guide assembly 30 may be selected by loosening the shaft retention bolt 50, sliding the cable guide shaft 31 up or down in the receptacle interior 43 and re-tightening the shaft retention bolt 50 against the cable guide shaft 31. In other embodiments, a cotter pin (not illustrated) may be used to retain the cable guide shaft 31 in the receptacle interior 43 of the shaft receptacle 40. In still other embodiments, the shaft receptacle 40 and the cable guide shaft 31 may have a square or other polygonal cross-sectional shape. Thus, the shaft receptacle 40 may prevent the cable guide shaft 31 from rotating in the receptacle interior 43. In some embodiments, the bolt nipple 42 and shaft retention bolt 50 may be omitted since the weight of the cable guide shaft 31 and cable guide bracket 32 may be sufficient to maintain seat the cable guide shaft 31 in the receptacle interior 43 of the shaft receptacle 40.

Figure 12:
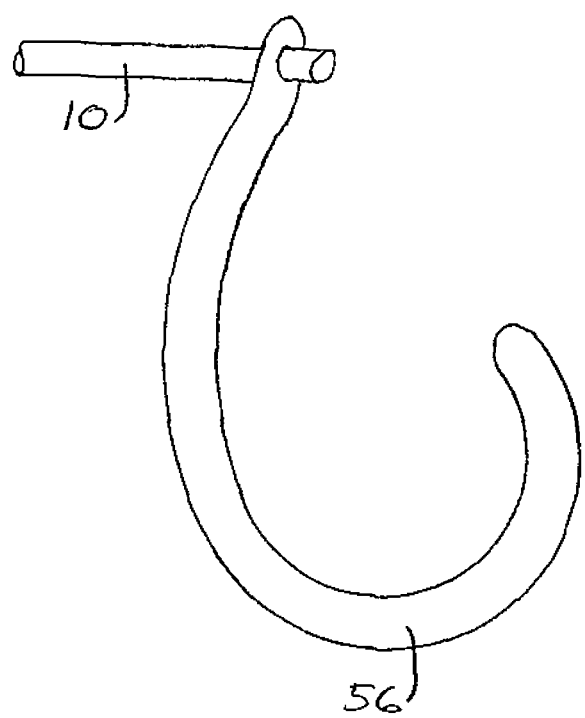
FIG. 12 is a side view of a typical cable hook terminating the cable to facilitate securing the cable around an object to be hoisted into the ATV bed on the ATV.

As illustrated in FIG. 12, a cable hook 56 may terminate the extending or distal end of the cable 10. The cable hook 56 may facilitate securing of the cable 10 around the object 90 preparatory to hoisting the object 90 into the ATV bed 80, as will be hereinafter described. The cable hook 56 may have any design which is suitable for the purpose. The cable hook 56 may be welded and/or otherwise attached to the cable 10 according to the knowledge of those skilled in the art.

As illustrated in FIGS. 13-15, in typical application, the hoist system 1 is operated to hoist an object 90 such as a wild game carcass from the ground 92 into the ATV bed 80 of the ATV 60. Accordingly, the overhead cable guide assemblies 30 may initially be installed on the ATV frame 74 typically by inserting and securing the cable guide shaft 31 of each overhead cable guide assembly 30 in the corresponding shaft receptacle 40, as was heretofore described with respect to FIGS. 4, 10 and 11. The cable 10 may be unwound from the winch 2 (FIG. 7), such as by reverse operation of the winch motor 6, and extended from the cable roller assembly 12 and upwardly against the cable guide member 26 of the front cable guide 24 and then rearwardly against the cable guide brackets 32 of the respective overhead cable guide assemblies 30, over the ATV bed 80 to the rear of the ATV 60. The ATV bed 80 may be deployed from the upright transport position illustrated in FIG. 15 to the tilted loading/unloading position illustrated in FIGS. 13 and 14, and the tailgate 81 may be lowered. The extending or distal end of the cable 10 may be extended or wound around the object 90 at least once, as illustrated in FIG. 13, and the cable hook 56 engaged with the remaining segment of the cable 10 to secure the cable 10 around the object 90.

The winch 2 may next be operated to wind the cable 10 on the winch shaft 5 of the winch spool 4. Accordingly, the cable 10 may shorten and pull the cable 10 forwardly over the respective cable guide brackets 32 of the overhead cable guide assemblies 30. Thus, the cable 10 may pull the object 90 initially along the ground 92 and then up over the tailgate 81 and the into the ATV bed 80, as illustrated in FIGS. 14 and 15, as the ATV bed 80 returns from the tilted loading/unloading position of FIG. 14 to the upright transport position of FIG. 15. The ATV 60 may then be driven to a truck (not illustrated) or other desired destination, after which the ATV bed 80 may again be deployed from the upright transport position of FIG. 15 back to the tilted loading/unloading position of FIGS. 13 and 14. The tailgate 81 may be lowered and the cable hook 56 disengaged from the cable 10. The object 90 may then be removed from the ATV bed 80.

It will be appreciated by those skilled in the art that the hoist system 1 can be manufactured with the ATV 60, or alternatively, may be retrofitted to existing ATVs 60. Accordingly, in the former case, the winch 2, the cable roller assembly 12, the front cable guide 24 and the overhead cable guide assembly or assemblies 30 can be welded and/or attached to the respective components of the ATV 60 using suitable mechanical fasteners suitable for the purpose. In the latter case, the winch 2, the cable roller assembly 12, the front cable guide 24 and the overhead cable guide assembly or assemblies 30 can be releasably attached to the respective components of the ATV 60 using screws, bolts, clips, clamps and/or other suitable mechanical fasteners according to the knowledge of those skilled in the art.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A hoist system for an all-terrain vehicle having a first vehicle end, a second vehicle end, a vehicle chassis, a vehicle frame carried by the vehicle chassis between the first vehicle end and the second vehicle end and a canopy on the vehicle frame, the hoist system comprising:
   a winch configured for mounting on the vehicle at the first vehicle end;
   a cable engaged by the winch, the cable having sufficient length to extend from the winch over the vehicle beyond the second vehicle end; and
   at least one overhead cable guide assembly configured for mounting in upward-standing relationship on the vehicle between the first vehicle end and the second vehicle end, the at least one overhead cable guide assembly including:
      a shaft receptacle configured for mounting on the vehicle frame of the vehicle, the shaft receptacle having a receptacle interior;
      a cable guide shaft seated in the receptacle interior of the shaft receptacle;
      a cable guide bracket carried by the cable guide shaft, the cable guide bracket supporting the cable, the cable guide bracket comprising a cable guide crosspiece carried by the cable guide shaft and a pair of parallel, spaced-apart cable guide flanges carried by the cable guide crosspiece; and
      a cable guide roller carried by the cable guide flanges, the cable guide roller supporting the cable.

2. The hoist system of claim 1 further comprising a cable roller assembly configured for mounting on the vehicle at the first vehicle end, the cable roller assembly including a roller assembly bracket configured for attachment to the vehicle, at least one pair of spaced-apart cable rollers carried by the roller assembly bracket and a cable space between the cable rollers, the cable extending through the cable space.

3. The hoist system of claim 2 wherein the at least one pair of spaced-apart cable rollers comprises a pair of spaced-apart vertical cable rollers carried by the roller assembly bracket and a pair of spaced-apart horizontal cable rollers carried by the roller assembly bracket between and perpendicular to the vertical cable rollers.

4. The hoist system of claim 3 wherein the roller assembly bracket comprises two spaced-apart pairs of vertically spaced-apart roller mount arms, and wherein the vertical cable rollers are mounted between the pairs of roller mount arms, respectively.

5. The hoist system of claim 4 further comprising a cable guide configured for mounting on the vehicle at the first vehicle end, the cable guide supports the cable between the cable roller assembly and the at least one overhead cable guide assembly.

6. The hoist system of claim 1 wherein the at least one overhead cable guide assembly comprises a first overhead cable guide assembly configured for mounting in upward-standing relationship on the vehicle proximate the first vehicle end and a second overhead cable guide assembly configured for mounting in upward-standing relationship on the vehicle proximate the second vehicle end.

7. An all-terrain vehicle, comprising:
   a vehicle chassis having a first vehicle end, a second vehicle end, a bumper carried by the vehicle chassis at the first vehicle end; a tilt-able bed carried by the vehicle chassis at the second vehicle end, a vehicle frame carried by the vehicle chassis between the first vehicle end and the second vehicle end and a canopy having a canopy top on the vehicle frame, the canopy top including a shaft opening; and
   a hoist system comprising:
      a winch carried by the bumper at the first vehicle end;
      a cable engaged by the winch, the cable having sufficient length to extend from the winch over the vehicle beyond the second vehicle end;
      a cable hook terminating the cable;
      a cable roller assembly carried by the vehicle at the first vehicle end, the cable roller assembly including a roller assembly bracket carried by the vehicle chassis, at least one pair of spaced-apart cable rollers carried by the roller assembly bracket and a cable space between the cable rollers, the cable extending through the cable space;
      at least one overhead cable guide assembly mounted in upward-standing relationship on the vehicle between the first vehicle end and the second vehicle end, the at least one overhead cable guide assembly including:
         a shaft receptacle carried by the vehicle frame of the vehicle beneath the canopy top of the canopy, the shaft receptacle having a receptacle interior disposed in alignment with the shaft opening in the canopy top of the canopy;
         a cable guide shaft extending through the shaft opening in the canopy top of the canopy and seated in the receptacle interior of the shaft receptacle; and
         a cable guide bracket carried by the cable guide shaft, the cable guide bracket supporting the cable; and
      a cable guide carried by the vehicle bumper at the first vehicle end, the cable guide supports the cable between the cable roller assembly and the at least one overhead cable guide assembly.

8. The all-terrain vehicle of claim 7 wherein the at least one overhead cable guide assembly comprises a first overhead cable guide assembly mounted in upward-standing relationship on the vehicle proximate the first vehicle end and a second overhead cable guide assembly mounted in upward-standing relationship on the vehicle proximate the second vehicle end.

9. The all-terrain vehicle of claim 7 wherein the cable guide bracket comprises a cable guide crosspiece carried by the cable guide shaft and a pair of parallel, spaced-apart cable guide flanges carried by the cable guide crosspiece.

10. The all-terrain vehicle of claim 9 further comprising a cable guide roller carried by the cable guide flanges, the cable guide roller supporting the cable.

* * * * *